US010743519B2

(12) United States Patent
Ruizenaar et al.

(10) Patent No.: US 10,743,519 B2
(45) Date of Patent: Aug. 18, 2020

(54) METHOD FOR DISTRIBUTING FEED OVER A PLURALITY OF SEPARATE FEEDING LOCATIONS AND A FEEDING SYSTEM THEREFOR

(71) Applicant: LELY PATENT N.V., Maassluis (NL)

(72) Inventors: Ruud Ruizenaar, Maassluis (NL); Arjan Smit, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 762 days.

(21) Appl. No.: 15/307,922

(22) PCT Filed: Apr. 9, 2015

(86) PCT No.: PCT/NL2015/050231
§ 371 (c)(1),
(2) Date: Oct. 31, 2016

(87) PCT Pub. No.: WO2015/178763
PCT Pub. Date: Nov. 26, 2015

(65) Prior Publication Data
US 2017/0055494 A1    Mar. 2, 2017

(30) Foreign Application Priority Data
May 22, 2014 (NL) ...................... 2012855

(51) Int. Cl.
*A01K 5/00* (2006.01)
*A01K 5/02* (2006.01)

(52) U.S. Cl.
CPC .............. *A01K 5/0283* (2013.01); *A01K 5/02* (2013.01); *A01K 5/0266* (2013.01); *A01K 5/0275* (2013.01); *A01K 5/0291* (2013.01)

(58) Field of Classification Search
CPC ................................ A01K 5/00; A01K 5/0283
(Continued)

(56) References Cited

U.S. PATENT DOCUMENTS 6,615,764 B2 * 9/2003 Voogd ...................... A01K 5/02
119/51.02
6,619,228 B2 * 9/2003 Voogd .................. A01K 5/0275
119/51.02
(Continued)

FOREIGN PATENT DOCUMENTS

NL        2008185 C         7/2013
WO   WO 2008/097080 A1    8/2008
WO   WO 2008/123820 A1   10/2008

OTHER PUBLICATIONS

Lely: "Lely Vector Brochure", pp. 1-24, XP002726888, Retrieved from the Internet: URL:http://www.lely.com/en/feeding/automatic-feeding-system/vector [retrieved on Jul. 9, 2014], total 32 pages, the whole document.

*Primary Examiner* — Richard T Price, Jr.
(74) *Attorney, Agent, or Firm* — Birch, Stewart, Kolasch & Birch, LLP

(57) ABSTRACT

A method for distributing feed over multiple separate feeding locations includes determining which feeding locations have a feed requirement; selecting a first feeding location among the feeding locations having a feed requirement; determining a feed composition to be delivered to the first feeding location; determining which further feeding locations have a feed requirement and require the same feed composition; selecting at least one further feeding location; filling the feed delivery device with an amount of the determined feed composition; and distributing the feed, wherein the amount of feed distributed to a selected feeding location depends on the ratio between amount to be delivered to said selected feeding location and the sum of the amounts of feed to be delivered to all selected feeding locations.

39 Claims, 1 Drawing Sheet

(58) Field of Classification Search
USPC .................... 119/51.01, 51.11, 51.12, 51.13
See application file for complete search history.

(56) References Cited

U.S. PATENT DOCUMENTS

| | | | | |
|---|---|---|---|---|
| 6,779,486 B2* | 8/2004 | Vaags | .................. | A01K 5/0266 |
| | | | | 119/51.02 |
| 2003/0070622 A1* | 4/2003 | Vaags | .................. | A01K 5/0266 |
| | | | | 119/51.11 |
| 2004/0149229 A1* | 8/2004 | Kochan | ................ | A01K 5/0291 |
| | | | | 119/51.11 |

* cited by examiner

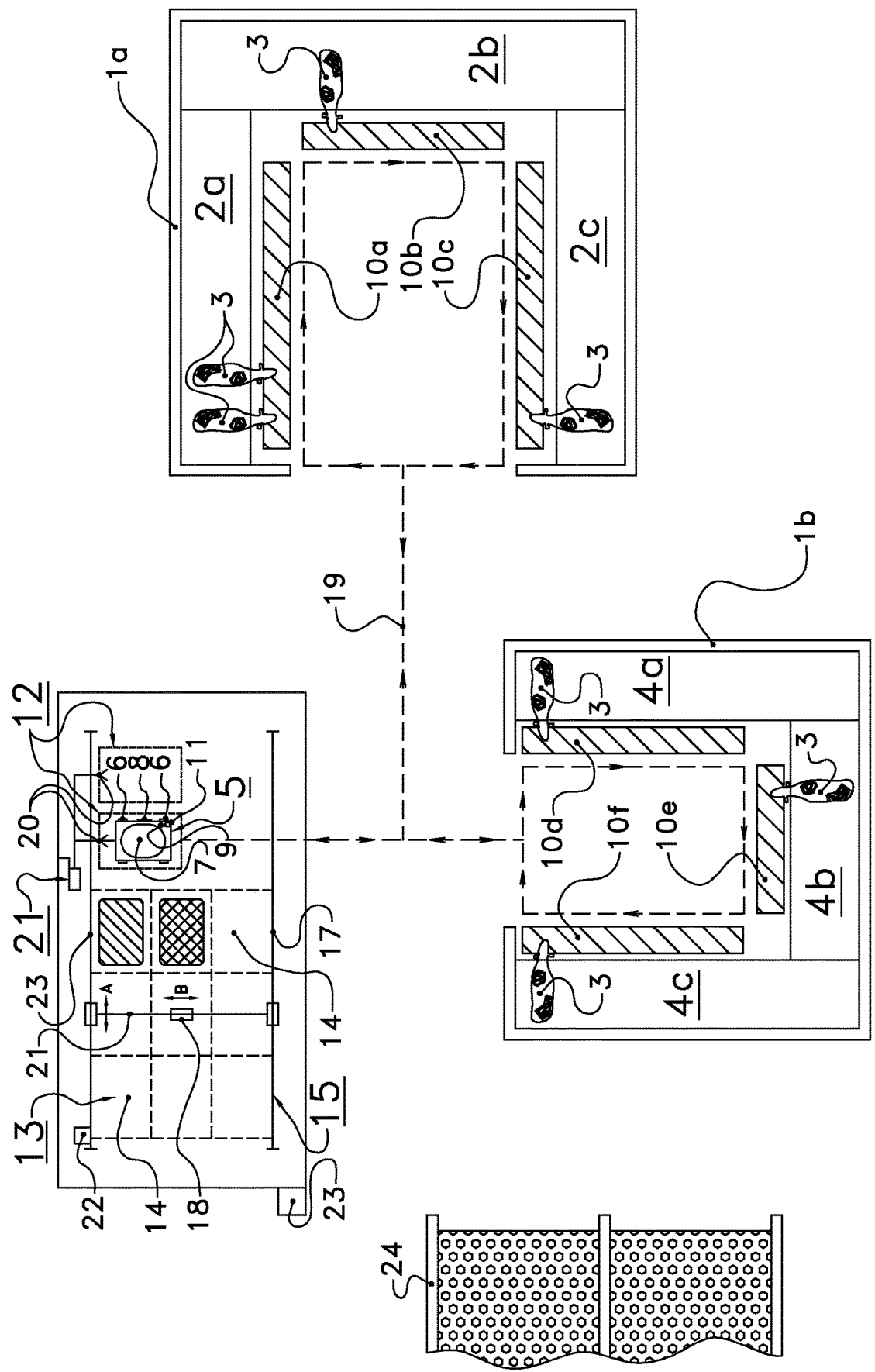

METHOD FOR DISTRIBUTING FEED OVER A PLURALITY OF SEPARATE FEEDING LOCATIONS AND A FEEDING SYSTEM THEREFOR

The invention relates to a method for distributing feed over a plurality of separate feeding locations.

In a dairy farm taking care of feeding the animals, i.e. the cows, is an important daily routine. This daily routine takes a lot of time when performed by a person. In order to save time and effort for the farmer, automatic feeding systems like the Lely Vector™ automatic feeding system may be used which, when employed, take care of most tasks within the routine.

Current automatic feeding systems include feed control systems programmed to autonomously determine a feed requirement for a feeding location, i.e. when to deliver feed to a feeding location. Each feeding location is assigned an associated feed composition, or feed ration or total mixed ration or the like, which may vary from feeding location to feeding location depending for instance on the corresponding type or age of animals that are fed at that feeding location. E.g. for dairy animals the ration may depend on the animal being lactating or not, for meat producing animals, the ration may depend on the monitored growth of the animals. The system thus delivers feed of a specific feed composition depending on the feeding locations to be provided with such feed in accordance with a determined feed requirement, i.e. a decision to deliver feed to selected locations. A particular amount of feed with the required feed composition for said feeding locations is then determined to be delivered to said feeding locations and prepared and loaded in a feed delivery device and subsequently delivered to said feeding location. Preparation may take place in a separate preparation device (stationary feed mixer) or in the feed delivery device when this is equipped with feed mixing means (which may include cutting means). An example of such a feed delivery device is the autonomous mixing and feeding robot of the Lely Vector System.

Although such systems work fine to automatically prepare and deliver feed to the animals without the constant assistance of a farmer, it has been found that currently available systems exhibit an unbalance between efficiency and quality of feed. For example, when it is ensured that the feed delivery device always runs with a full load, the quality of the feed and in particular the freshness of it will suffer, because the delivery is done less often. Alternatively when the feed delivery device is programmed to feed more often but smaller amounts, the quality of feed and in particular it's freshness improves, but the capacity of the system suffers. Feeding more often and in smaller amounts may also lead to inaccuracy in the feed composition vis-a-vis the required feed composition. As the feed composition is important for the well-being of animals and milk production of dairy animals, it is desired that the actual prepared and delivered feed composition is according to the recipe or close to it.

It is thus an object of the invention to improve the system's balance between efficiency of the system and quality of the feed delivered to the animals.

This object is achieved by providing a method for distributing feed over a plurality of separate feeding locations using a feed delivery device according to claim 1, wherein the method comprises the following steps:

a) determining which feeding locations have a feed requirement;
b) selecting a first feeding location among the feeding locations having a feed requirement;
c) determining a feed composition for the feed to be delivered to the first feeding location and determining a first amount of said feed to be delivered to the first feeding location;
d) determining which further feeding locations having a feed requirement require the same feed composition as the first feeding location;
e) selecting at least one further feeding location and determining a further amount of said feed to be delivered to said further feeding location;
f) filling the feed delivery device with an amount of the determined feed composition;
g) distributing the filled amount of feed in the feed delivery device over the selected feeding locations, wherein the amount of feed from the filled amount which is distributed to a selected feeding location is dependent on the ratio between the amount of feed to be delivered to said selected feeding location and the sum of the amounts of feed to be delivered to all selected feeding locations times the filled amount.

Thus in accordance with the invention the feed delivery device is filled with an amount of feed of a particular feed composition, ensuring an efficient use of the system, and then distributes said filled amount of feed proportionally to the respective to be delivered amounts of feed of the respective feed locations, thus to more than one feeding location, ensuring optimal freshness of the feed.

The invention is based on the insight of the inventors that the deficit between delivered and required feed composition in particular occurs when the to be prepared amount of the feed composition is low. This happens for so-called small feeding locations where not a lot of animals are present. In such a case the different ingredients making up the feed composition are to be loaded in such small sub-amounts that the required accuracy cannot be met, causing a deviation from the prescribed sub-amounts per ingredient and resulting in a different prepared feed composition. By filling the feed delivery device with an amount and distributing it proportionally to several feeding locations, the total amount of prepared feed composition is bigger and thus the sub-amounts of individual feed ingredients are more accurately dosed.

Another advantage of the method according to the invention is that the operating costs are lowered as there are less required feeding rounds per time frame because feed is delivered to more than one feeding location at a time, i.e. per feeding round, while ensuring the freshness of the feed.

A further advantage of the method according to the invention may be that when a feed delivery device is used which also mixes the ration, the mixing can be performed better, i.e. results in a more homogeneous mixed ration. This is caused by the fact that for good mixing not only the mixing time is important, but also the amount to be mixed in relation to the fill capacity of the device. For good mixing a minimum amount of feed is required to be loaded into the mixing device. By preparing feed to be delivered to more than one feeding location, it is more likely that this minimum amount of feed is exceeded.

Another advantage of the method according to the invention is that the capacity of the feeding system is increased, because it can deliver feed to more than one feeding location per feeding round.

In an embodiment, the method further comprises the step of determining a maximum filling amount of the feed delivery device for the determined feed composition. In this way the use of the delivery device is maximized. Advantageously the maximum filling amount for a delivery device which also mixes the feed is chosen such that feed is not thrown out during driving or mixing, thus preventing waste.

In an embodiment, the feed delivery device is filled with the maximum filling amount of feed. In this way the mixing performance is maximal as deviations are spread out over the maximum amount of feed.

In an embodiment, further feeding locations are selected until the sum of the amounts of feed to be delivered to all selected feeding locations equals or exceeds the maximum filling amount. In this way, the chance of selecting too many feeding locations is reduced.

In order to always fill the feed delivery device to the maximum filling amount, the further feeding locations are selected until the sum of the amounts of feed to be delivered to all selected feeding locations equals or exceeds the maximum filling amount. The consequence thereof is that all selected feeding locations receive a proportional amount of the determined amount to be delivered, which means that the frequency of feed being delivered to the feeding locations will be increased. This advantageously increases the average freshness of the feed at the feeding locations.

It is also possible that all further feeding locations having a feeding requirement are selected but the sum of the amounts of feed to be delivered to all selected feeding locations does not exceed the maximum filling amount. Selecting any further feeding locations may then be stopped, and the feed delivery device will be filled to the maximum filling amount. This means that the selected feeding locations will each proportionally receive an amount based on the determined amount but which is more than the determined amount. This will result in the frequency of feed being delivered to the feeding locations being decreased, but will on the other hand increase the capacity of the feeding system.

In an embodiment, selecting a first feeding location comprises determining a respective priority for the feeding locations having a feed requirement, wherein the first feeding location is the feeding location having the highest priority. This ensures that the feeding location which requires feed the most receives feed in the next distribution cycle and minimizes the chance of an empty feeding location or at least minimizes the duration that a feeding location is empty.

In an embodiment, selecting further feeding locations is done in descending order of priority. An advantage of evaluating the further feeding locations in descending order of priority is that the method aims to service feeding locations with a high priority earlier than feeding locations with a low priority.

In an embodiment, determining which feeding locations have a feed requirement is based on a rest feed measurement which is representative for the amount of feed present at a respective feeding location. An advantage thereof is that a feed requirement is determined based on actual feed measurements instead of being determined based on a daily delivery schedule according to which feed is delivered to the animals during a day, which is incapable of determining an actual feed requirement and may lead to empty feeding locations or too much feed at a feeding location.

Rest feed measurements can be done by weight sensors in connection to a feeding location, with feed height measurements, by 3D camera which can determine a feed volume, or even by a person taking note of the remaining feed at the feeding locations.

In an embodiment, determining which feeding locations have a feed requirement comprises comparing the rest feed measurement with a threshold value representative for a minimum amount of feed, wherein a feeding location is determined to have a feed requirement when the rest feed measurement for said feeding locations below the threshold value corresponding to said feeding location. For instance, the rest feed measurement of a feeding location may result in kg feed at the feeding location, a volume of feed at the feeding location or in a feed height at the feeding location, e.g. in centimeters, and the threshold value may be a respective minimum weight, minimum volume, a minimum feed height or a minimum average feed height at that feeding location.

The same may be done when the feed measurement is representative for the average amount of feed remaining along the feeding location.

An advantage of using a minimum amount of feed, or a minimum average amount is that a feed requirement is already determined when there is still some feed left at the feeding location and thus there is enough time to deliver new feed before the feeding location is empty or at least the time the feeding location is empty is minimized.

Another advantage of the threshold is that it is an easy parameter to control and adjust. Hence, it allows the user to easily adjust the threshold in accordance with its wishes.

In an embodiment, determining which feeding locations have a feed requirement may include determining or estimating which feeding locations have a feed requirement in the near future. Determining or estimating which feeding locations have a feed requirement in the near future may for instance be carried out when there are no further feeding locations having a feed requirement to select besides the first feeding location, or when all further feeding locations having a feed requirement have been selected but the sum of the amounts does not exceed the maximum filling amount. This ensures that the feed delivery device is always filled to the maximum amount maximizing the efficiency and capacity of the system and that sufficient fresh feed is delivered to all animals.

Estimating which feeding locations have a feed requirement in the near future may be based on the elapsed time since the last time a feeding location received feed, possibly in combination with average times between successive deliveries of feed to a feeding location, which average times can be based on a schedule or on feeding history.

Determining or estimating which feeding locations have a feed requirement in the near future may alternatively or additionally involve adjusting the rest feed measurement based determination, e.g. by increasing the threshold value representative for a minimum amount of feed and comparing the rest feed measurement with the increased threshold to see if a feeding location can then be considered to have a feed requirement (in the near future). The same result may be obtained by for instance lowering the rest feed measurement with a predetermined value, e.g. 10%.

In an embodiment, determining a respective priority for the feeding locations having a feed requirement is based on the rest feed measurements of those locations. In particular, when using rest feed measurements, the feeding location having the largest difference between the respective rest feed measurement and the corresponding threshold value, i.e. the largest deficit, will be assigned the highest priority.

In an embodiment, determining a respective priority for the feeding locations having a feed requirement is based on a period of time measured from a starting point in time when a feeding requirement of a respective feeding location was determined for the first time after an earlier point in time when feed was delivered to that location. Thus, for instance, in addition to assigning priority based on the deficit relative to the rest feed threshold value, a time stamp can be added to the feed requirement indicating when it was determined to be present. Different feeding locations may then have feed requirements which are different in deficit relative to their rest feed threshold value as well as in time stamp. By using the time stamps as a 'weighting factor' in determining the respective priority for delivering feed to the feeding locations which have a feed requirement, a location with a (marginal) smaller deficit may get priority over a feeding location with a larger deficit because it's feed requirement is older. This ensures a good distribution of the freshness of the feed over the feeding locations and at the same time guarantees no feed location can get passed over.

A feed delivery device may have a predetermined, fixed route along all feeding locations, and the route starting and ending at a location, preferably at a loading station such as a feed loading and/or battery loading station, where the feed delivery device is filled with the feed composition and/or where it charges its batteries. Hence, during each run or feeding round the feed delivery device, if equipped with an appropriate measurement system, is able to measure the amount of feed present at the all feeding locations and to deliver feed to multiple feeding locations without having to adapt its route. Alternatively, e.g. in case the feed delivery device is an autonomous vehicle, the feed delivery device may have more then one predetermined routes, and all routes together will cover all feeding locations.

It is further possible that the method is carried out using multiple feed delivery devices. Each having the same or a different predetermined route or routes. The amount of feed present at a feeding location can be measured every time a feed delivery device passes. The data thus obtained may be used by other feed delivery devices to determine the feeding locations with a feed requirement.

In an embodiment, the feed delivery device moves along a predetermined route past a plurality of feeding locations when delivering the feed. The feeding locations comprised in the predetermined route may be grouped depending on obstacles present along the route that may interfere with the feed delivery device during distributing the feed, wherein in step e) only the further feeding locations are selected which also belong to the same group as the first feeding location. In this way, the distribution of the feed is finished before the obstacle is met along the route, so that the chance of interference between the feed delivery device and the obstacle are minimized.

The invention also relates to a feeding system for distributing feed over a plurality of separate feeding locations, comprising a feed delivery device and a feed loading system and a feed control system, wherein the feed delivery device is configured to deliver feed to one or more feeding locations, and the feed loading system is configured to fill the feed delivery system and wherein the feed control system is configured to:
  a) determine which feeding locations have a feed requirement;
  b) select a first feeding location among the feeding locations having a feed requirement;
  c) determine a feed composition for the feed to be delivered to the first feeding location and determine a first amount of said feed to be delivered to the first feeding location;
  d) determine which further feeding locations having a feed requirement require the same feed composition as the first feeding location;
  e) select at least one further feeding location and determine a further amount of said feed to be delivered to said further feeding location;
  f) control the feed loading system to fill the feed delivery device with an amount of the determined feed composition;
  g) control the feed delivery device to drive and move along the selected feeding locations to distribute the filled amount of feed in the feed delivery device over the selected feeding locations, wherein the amount of feed distributed to a selected feeding location is dependent on the ratio between the amount of feed to be delivered to said selected feeding location and the sum of the amounts of feed to be delivered to all selected feeding locations times the filled amount.

Thus in accordance with the invention the feed delivery device is filled with an amount of feed of a particular feed composition, ensuring an efficient use of the system, and then distributes said filled amount of feed proportionally to the respective to be delivered amounts of feed of the respective feed locations, thus to more than one feeding location, ensuring optimal freshness of the feed.

In an embodiment, the feed delivery device is an autonomous feed delivery device, preferably due to the control system which preferably is at least partially a part of the feed delivery device.

Preferably, the feed delivery device is a mobile self-propelled device including a regulating unit with which it can preferably autonomously determine its location and is capable to move and navigate along a route, which route may be predefined.

In an embodiment, the feeding system further comprises a feed stock system and a loading station, wherein the feed delivery device is configured to deliver feed from the loading station to the one or more feeding locations, and wherein the feed loading system is configured to deliver feed from the feed stock system to the feed loading station to fill the feed delivery device when it is in the loading station.

Alternatively, the feeding system the feed loading system may comprise a feed loading device on the feed delivery device, which feed loading device is arranged to load feed from the feed stock system and to fill the feed delivery device itself. The feed loading device on the feed delivery device may in particular be a feed grabber. Alternatively the feed loading device on the feed delivery device may be a silage block cutter, or a silage rotatable cutter in combination with a moving belt, or the like.

In an embodiment, the feed system and in particular the feed delivery device comprises a rest feed measurement system configured the determine the amount of feed remaining at a feeding location. The term rest feed is used to indicate feed at the feeding location of which the amount is measured, as opposed to feed in the feed delivery device. The rest feed measurement may provide an average feed height at the feeding location, preferably after sweeping the feed to get a reproducible rest feed measurement.

In an embodiment, the feed delivery device comprises a mixing device for mixing feed. Alternatively, the mixing device may be provided separately from the feed delivery device, wherein for instance the mixing device after mixing the feed fills the feed delivery device.

In an embodiment, the feed delivery device comprises a door allowing feed to be dispensed, which door extends away from the feed delivery device when at least partially opened. The control system is then preferably configured to combine only feeding locations in a single feeding round which are in a same group stored in the control system based on obstacles along the route that may interfere with an opened or partially opened door of the feed delivery device.

It is to be noted here that throughout the application, the reference to animals actually means non-human animals, in particular livestock.

The invention will now be described in a non-limiting way by reference to the accompanying FIG. 1 which schematically depicts a plan view of a dairy farm.

FIG. 1 depicts schematically a dairy farm comprising in this example two barns 1a, 1b to accommodate animals, i.e. cows 3. Only some cows 3 are shown in FIG. 1, but it will be clear that the barns 1a, 1b may accommodate more animals. To feed the cows 3, a feeding system is provided comprising in this embodiment a self propelled mixing and feeding vehicle 5 as feed delivery device. The self propelled feeding vehicle 5 is movable with wheels 6 over the ground. The feeding vehicle 5 comprises a container 7 to hold feed and a mixing device 5 is provided to mix the feed (not shown). A feed discharging device 8 is provided on the feed delivery vehicle to discharge feed from the container 7, the discharging device comprises a door in the container 7 (not shown). A rest feed measurement device 9 is provided to measure the amount of feed at feeding locations 10a-10f in the barns. A vehicle drive and control unit (not shown) is provided on the vehicle for driving and controlling the feed vehicle and its devices. The drive and control system of the feed vehicle 5 is regulatable by a regulating unit 11 of the feed vehicle 5. In this example embodiment, the drive and control system comprises an electric drive motor in each case for each wheel 6 (not shown). The electric drive motors of the wheels 6 are regulatable independently from one another. Through the regulation of the torque or the speed of rotation of the wheels 6, the feed vehicle 5 can travel in a straight line forwards, in a straight line backwards, or in a curve.

The drive and control system comprises a battery system for storing electrical energy (not shown). The battery system is connected to the electric drive motors. In the FIGURE, the feed vehicle 5 is set up on a loading station 12, in which the container 7 of the feed vehicle 5 is filled with an amount of feed. The loading station 12 comprises a charging point 20 of a charging system 21 for charging the battery system of the feed vehicle 5. The loading station 12 therefore also forms a battery charging station. The regulating unit 11 of the feed vehicle 5 is designed to regulate the mixing device in such a way that the mixing device mixes the feed held in the container 7 while the feed vehicle 5 is connected to the charging point 20 at the loading station and the battery system of the feed vehicle 5 is charged by means of the charging system 21.

In this example embodiment, the feed stock system 13 comprises a feed kitchen. The feed kitchen comprises a number of compartments 14 on the substrate, in which different types of feed are arranged separately from one another. Obviously, the feed stock system 13 can also be designed differently. A feed-loading system 15 is provided to transfer feed from the feed stock system 13 to the container 4 of the feed vehicle 5 when the feed vehicle 5 is set up on the loading station 12.

In this example embodiment, the feed-loading system 15 comprises a movable support rail 16 which is movably (see arrow A) disposed on two fixed support rails 17 which are disposed parallel to one another and at a distance from one another. The movable support rail 16 comprises a trolley 18 movable along said rail (see arrow B), so that the trolley 18 can be positioned above each of the compartments 14 with types of feed.

The trolley 18 is provided with a vertically movable grabber (not shown) to grab feed from the compartments 14. Said feed can then be moved to above the container 7 of the feed vehicle 5 and can then be released by the grabber. Due to the transfer of a plurality of types of feed to the container 7 of the feed vehicle 5, a mixture occurs therein for feed types. The feed loading system 15 also comprises an operating unit 44. Alternatively a feed loading system could also be integrated with the feed vehicle 5, the vehicle including a feed loading system or device and then traveling to the required compartments 14, or to silage storage 24 or the like, and fill itself.

The feed system includes a feed control system 23 which may at least partially be provided on the feeding vehicle in the form of the regulating unit, and is provided with at least one memory in which data are stored. The data stored in the memory of the feed control system 23 comprise navigation data, ration data and operating data. The navigation data comprise route segment date, on the basis of which the feed vehicle 5 is able to travel different routes, for example a first route 19 from the loading station 12 to the feed location 10a in barn 1a, then to feed locations 10b and 10c and through to barn 1b to feed locations 10d, 10e and 10f and back to the feed loading station 12. Or a route comprising only feed locations 10a-10c in barn 1a, and a further route for feed locations 10d-10f in barn 1b.

The rations stored in the memory of the feed control system 23 comprise a plurality of rations for the animals. Each ration is determined by a total quantity of feed and the composition thereof, for example the total quantity of feed in kg and the recipe (ratio) or the number of kg per feed type and linked to a feed location. The feed locations are linked to type of animals and the number of animals at that location.

The operating data comprise, for example, operating data for operating the feed discharging device 8 of the feed vehicle 5 and operating data for operating the livestock building door 35. In addition, the data stored in the memory of feed control system 23 comprises an input with which one of the rations and at least one of the feed locations can be selected in the feed control system 23. The input may include rest feed measurement data delivered to the feed control system 23 by the regulating unit 11 of the feeding vehicle. Depending on the input, the feed control system 23 determines a packet of data from the data stored in the memory of the control system 23 and delivers the data to the regulating unit of the vehicle 5. To this purpose both the feed control system 23 and the regulating unit 11 of the vehicle are provided with data communication tools to send and receive data. Once the vehicle 5 has received the data it will prepare to execute feeding the feed location which according to these date needs to be provided with feed. Data are transmitted preferably while the vehicle 5 is in the loading station 12. The feed control system is connected with the loading station 12 and can then transmit data to the regulating unit. Such data could also be transmitted wirelessly by suitable means, such as WIFI, or Bluetooth sending/receiving units.

The vehicle 5 places a feed order at a feed loading system 15 which feed loading system is also provided with suitable data communication tools. The feed loading system 15 and its operating unit 22 will then transport feed ingredients from feed stocked in the relevant feed storage compartments 14 to the loading station 12, when it receives a feed order data from feeding vehicle 5, to fill it with the ordered composition of feed.

The feed loading system 15 and the feeding vehicle 5 both are autonomous devices controlled by operating unit 22 and regulating unit 11 respectively, and can communicate with each other and/or with the feed control system 23. Alternatively, feed control system 23 could directly control the feed loading system 15 and the feeding vehicle.

In order to keep the feed fresh or as fresh as possible, the feed is initially stored in a long term storage like a silo 17 and subsequently transported, e.g. as bales, to the feed storage location in the building 15.

In the shown embodiment, each barn 1a, 1b has three fenced areas, respectively fenced areas 2a, 2b, 2c for barn 1a and fenced areas 4a, 4b, 4c for barn 1b where animals can be held in groups separate from the other groups. The animals on a dairy farm may be divided into one or more feed groups, like milking cows dry cows, young animals etc., each group requiring a different feed composition, i.e. a different mixed feed ration.

Each fenced area has an associated feeding location 10a-10f where feed is provided for the animals to eat. The feeding locations are located outside the fenced areas so that animals have to reach over or through a respective fence to get to the feed at the feeding location, keeping the feed separated from manure. This creates not only a clean, but also a safe area for the feeding vehicle to move along the feeding locations without interfering with the animals.

In this embodiment, the feeding vehicle or feed delivery device 5 includes a mixing device within the vehicle to mix the feed. However, this mixing device may also be provided separately, as part of loading system 15 or be absent at all.

In the displayed embodiment the feeding vehicle 5 is provided with a rest feed measurement device 9 and while the feeding vehicle travels along the feed fences the amount of feed at the feed locations is measured. The data are stored in a memory in the regulating unit 11 and communicated to the central feeding control system 23 when the vehicle is in the feed loading station 12.

The feed control system 23 determines, based on the measured amounts of feed at the feeding locations, which one of these locations has a feed requirement (which is explained below by way of an example). The feed control system 23 then determines which feeding location needs to be provided with feed at the next feeding round of the feeding vehicle, and prepares the necessary data and transmits these data to the regulating unit of the feeding vehicle. The feeding vehicle can then drive its route and measure the feed amounts of feed at the feeding locations and provide the selected first and further feeding locations with feed.

Table 1 indicates possible settings present in the memory of the feed control system 23 for the fenced areas and corresponding feeding locations 10a-10f. The feed composition is simplified by referring to a letter, so that it can easily be seen that feeding location 10a, 10b and 10e require feed of composition A which is different from feed composition B required at feeding location 10c, 10d and 10f. Feed composition may alternatively be referred to as ration or mixed feed ration, or TMR.

The amount of feed measured to as present at a feeding location is in this embodiment represented by the average height of feed in centimeters at a feeding location after it has been swept. Sweeping is usually performed by either feeding vehicle 5 itself, a separate sweeping robot or personnel. The threshold is the minimum average height that is accepted without having to deliver new feed. When the average height at a feeding location gets below the threshold, a feed requirement is determined and a first amount is decided to be delivered by feed delivery device 5 to the feeding location, which amount is expressed in kilograms and delivered to the feeding location. In this embodiment, the first amount of feed is distributed along the length of the feed fence of the feeding location. The first amount is determined and depends amongst other things on the size (length of the feed fence) of the feeding location, on the number and type of animals present in the corresponding fenced area, type of feed ration, settings made by the user (e.g. user may define the amount). As long as the settings remain the same, the first amount remains the same too.

TABLE 1 exemplary settings for fenced areas

| Fenced area | Feeding location | Feed composition | Amount (kg) | Threshold (cm) |
|---|---|---|---|---|
| 2a | 10a | A | 500 | 10 |
| 2b | 10b | A | 300 | 5 |
| 2c | 10c | B | 200 | 15 |
| 4a | 10d | B | 150 | 15 |
| 4b | 10e | A | 200 | 10 |
| 4c | 10f | B | 150 | 10 |

FIG. 1 further shows in dashed lines a route 19 that may be taken by the feeding vehicle 5 during a run/feeding round past all feeding locations. In this embodiment, when the vehicle has been filled at the feed loading station 12 it will first go to barn 1a, where it passes feeding locations 10a, 10b and 10c. It then moves to barn 1b and passes feeding locations 10d, 10e and 10f. Every time the feeding vehicle 5 makes a feeding round feed may be swept at each feeding location and the height of the feed is measured.

An outcome of a feeding round may be that temporarily none of the feeding locations have a feeding requirement. Hence, no next feeding round will be planned based on delivering feed. However, the system may be programmed such that at regular intervals, the feeding vehicle makes a run past all feeding locations to determine whether there are feeding locations having a feed requirement. Alternatively the feed measurement device 9 may be present at the feeding location and measure the amount of feed present at the feeding locations repeatedly or continuously, e.g. by providing weighing cells in a feed bunk. Table 2 comprises example measurement results of rest feed at the feeding locations.

TABLE 2 rest feed measurement results

| Feeding location | Feed composition | Amount (kg) | Threshold (cm) | Average height measurement (cm) |
|---|---|---|---|---|
| 10a | A | 500 | 10 | 6 |
| 10b | A | 300 | 5 | 4 |
| 10c | B | 200 | 15 | 18 |
| 10d | B | 150 | 15 | 13 |
| 10e | A | 200 | 10 | 4 |
| 10f | B | 100 | 10 | 11 |

By comparing the feed measurement in the form of the average height measurement of the feed at the feeding locations with the corresponding threshold it can be seen that feeding locations 10c and 109f have enough feed and thus do not require fresh new feed. On the other hand, feeding locations 10a, 10b, 10d and 10e require feed. To determine a priority, the differences between the average height measurement and the corresponding thresholds may be determined. This results in the following differences:

Feeding location 10*a:* 4 cm
Feeding location 10*b:* 1 cm
Feeding location 10*d:* 2 cm
Feeding location 10*e:* 6 cm Hence, feeding location 10*e* having largest the difference, is determined by the feed control system to have the highest priority, followed by respectively feeding location 10*a*, 10*d* and 10*b* in descending order with location 10*b* having the lowest priority. As can be seen in the table 2 the amount of feed to be delivered to feeding location 10*e* with the highest priority is 200 kg of feed composition A. The method according to the invention, the feed control system then determines whether there are further feeding locations requiring feed composition A. In the example above feeding locations 10*a* and 10*b* also require feed composition A, respectively 500 and 300 kg.

In accordance to the inventive method, the system then determines what the maximum filling amount of the container 7 of the feed delivery device 5 is for feed composition A. In this example this maximum filling amount for feed composition A and container 7 is set at 600 kg. Hence, the amount of required feed of the first feeding location 10*e* in this embodiment does not exceed the maximum filling amount of the feed delivery device 5. Hence, in this example, and accordance with the invention, the feed control system 23 will evaluate the further feeding locations having a feed requirement of the same feed composition in descending order of priority. In this example, the next feeding location to be evaluated is feeding location 10*a* requiring 500 kg of feed composition A. Selecting feeding location 10*a* results in the sum of required amounts of the all selected feeding locations (in this example feeding location 10*e* with 200 kg) so far, to be 700 kg which exceeds the maximum filling amount of the feed delivery device.

In this example, the control system 23 will then stop selecting of further feeding locations will stop.
The feed control system 23 determines that 600 kg of feed composition A needs to be delivered to feed locations 10*e* and 10*a*, and prepares a suitable data package for the feed delivery device to be able to execute the order. The data package including at least the feed components and amounts to be loaded, mixing time, and navigation route information. With the feed delivery device 5 at the feed loading station 12, the data is then sent from the control system 23 to the regulating unit 11 of the feeding vehicle 5, which then can communicate to the feed loading system 15 which fills the container 7 of the feed delivery device 5 with the 600 k of feed composition A. The feeding vehicle 5, once filled, drives along the route it 19 to sweep feed, measure the amount of feed present at the feeding locations and deliver the 600 kg of feed composition A to feeding locations 10*e* and 10*a*, and return to the feed loading station 12 and communicate the feed measurement data as well as the data of the feed delivery to the feed control system 23. After which the process of determining which feeding location requires new feed the most is repeated.

In accordance with the invention the 600 kg, which is the filled amount of the container 7 of the feeding vehicle 5, is proportionally divided over feeding locations 10*a* and 10*e*, dependent on the ratio between the amounts to be delivered (200 kg for location 10*e* and 700 kg for location 10*a*) times the filed amount (600 kg). Hence, feeding location 9*a* will actually receive (500/700)*600=429 kg and feeding location 9*e* will actually receive (200/700)*600=171 kg.

Instead of stopping selecting further feeding locations once the maximum filling amount is exceeded, the feed control system 23 may continue selecting further feeding locations. For instance, further feeding locations may be selected until selecting a next further feeding location would result in at least one of the individual amounts of feed distributed to the selected feeding locations getting below a minimum amount of distributed feed. Of course if the conditions of the maximum filling amount of the feed delivery device or the minimum amount of distributed feed are not reached before running out of further feeding locations, the selection process will stop once no non-selected feeding locations are present anymore.

In any event, the feed delivery vehicle will now be loaded with a larger amount of feed then would be the case when no further feeding location would be selected. And due to the larger amount of feed in the feeding vehicle, the loading and the mixing process are improved resulting in a more precisely prepared feed composition and the difference between requested and actually delivered feed compositions is reduced. Thereby improving the quality of the feed at both feeding location 10*e* and 10*a*.

In an embodiment, the feeding locations 10*a*-10*f* are divided into two groups due to an obstacle along route 19, which obstacle could interfere with the feed delivery vehicle 5 when distributing the feed is not finished yet. This feeding vehicle 5 may for instance comprise a door that is slid open vertically and when open or not completely closed it may extend above the mixing and feeding robot. When there is an obstacle, for instance the access opening of the barns 1*a* and 1*b*, this may interfere with the open door of the vehicle 5. Hence, the access openings of the barns seen as obstacle and used to divide the feeding locations into a first group 10*a*, 10*b*, 10*c* and a second group 10*d*, 10*e*, 10*f*. Thus in an embodiment the feed control system 23 will determine, if when feeding more then one feeding locations, an obstacle is present. If that is the case, it will only combine those feeding locations that are in the same group, and prevent problems with the obstacle.

In the abovementioned example, priority is assigned based on a rest feed measurement. However, priority may also be assigned based on a distribution plan and amount of time that has passed since a previous feeding delivery action at a particular feeding location.

The invention claimed is:

1. A method for distributing feed over a plurality of separate feeding locations using a feed delivery device, comprising the following steps:
    a) determining which feeding locations have a feed requirement;
    b) selecting a first feeding location among the feeding locations having a feed requirement;
    c) determining a feed composition for the feed to be delivered to the first feeding location and determining a first feed amount of said feed to be delivered to the first feeding location;
    d) determining which further feeding locations having a feed requirement require the same feed composition as the first feeding location;
    e) selecting at least one further feeding location and determining a further amount of said feed to be delivered to said further feeding location;
    f) filling the feed delivery device with an amount of the determined feed composition; and
    g) distributing the filled amount of feed in the feed delivery device over the selected feeding locations,
    wherein the amount of feed from the filled amount which is distributed to a selected feeding location is dependent on the ratio between the amount of feed to be delivered to said selected feeding location and the sum of the amounts of feed to be delivered to all selected feeding locations times the filled amount.

2. The method according to claim 1, further comprising the step of determining a maximum filling amount of the feed delivery device for the determined feed composition.

3. The method according to claims 2, wherein the feed delivery device is filled with the maximum filling amount of feed.

4. The method according to claim 3, wherein further feeding locations are selected until the sum of the amounts of feed to be delivered to all selected feeding locations equals or exceeds the maximum filling amount.

5. The method according to claim 1, wherein selecting a first feeding location comprises determining a respective priority for the feeding locations having a feed requirement, wherein the first feeding location is the feeding location having the highest priority.

6. The method according to claim 5, wherein selecting further feeding locations is done in descending order of priority.

7. The method according to claim 5, wherein determining which feeding locations have a feed requirement is based on a rest feed measurement which is representative for the amount of feed remaining at a feeding location, and wherein determining a respective priority for the feeding locations having a feed requirement is based on the rest feed measurement.

8. The method according to claim 5, wherein determining a respective priority for the feeding locations having a feed requirement is based on a period of time measured from a starting point in time when a feeding requirement of a respective feeding location was determined for the first time after an earlier point in time when feed was delivered to that location.

9. The method according to claim 1, wherein determining which feeding locations have a feed requirement is based on a rest feed measurement which is representative for the amount of feed remaining at a feeding location.

10. The method according to claim 9, wherein determining which feeding locations have a feed requirement comprises comparing the rest feed measurement with a threshold value representative for a minimum amount of feed, wherein a feeding location is determined to have a feed requirement when the rest feed measurement for said feeding location is below the threshold value corresponding to said feeding location.

11. The method according to claims 10, wherein determining a respective priority for the feeding locations having a feed requirement comprises determining a difference between the respective rest feed measurement and the corresponding threshold value for each feeding location having a feed requirement, and wherein the first feeding location is the feeding location having the largest difference.

12. The method according to claim 1, wherein the feed delivery device moves along a predetermined route past a plurality of feeding locations when distributing the feed.

13. The method according to claim 12, wherein the feeding locations comprised in the predetermined route are grouped depending on obstacles present along the standard route that may interfere with the feed delivery device during distributing the feed, and wherein in step e) only further feeding locations are selected which belong to the same group as the first feeding location.

14. The feeding system according to claim 12, wherein the feed delivery device comprises a door allowing feed to be dispensed, the door extending away from the feed delivery device when at least partially opened.

15. A feeding system for distributing feed over a plurality of separate feeding locations in a farm, the system comprising:
   a feed delivery device;
   a feed loading system; and
   a feed control system,
   wherein the feed delivery device is configured to deliver feed to one or more feeding locations, wherein the feed loading system is configured to fill the feed delivery system and wherein the feed control system is configured to:
   a) determine which feeding locations have a feed requirement;
   b) select a first feeding location among the feeding locations having a feed requirement;
   c) determine a feed composition for the feed to be delivered to the first feeding location and determine a first amount of said feed to be delivered to the first feeding location;
   d) determine which further feeding locations having a feed requirement require the same feed composition as the first feeding location;
   e) select at least one further feeding location and determine a further amount of said feed to be delivered to said further feeding location;
   f) control the feed loading system to fill the feed delivery device with an amount of the determined feed composition; and
   g) control the feed delivery device to drive and move along the selected feeding locations and to distribute the filled amount of feed in the feed delivery device over the selected feeding locations,
   wherein the amount of feed distributed to a selected feeding location is dependent on the ratio between the amount of feed to be delivered to said selected feeding location and the sum of the amounts of feed to be delivered to all selected feeding locations times the filled amount.

16. The feeding system according to claim 15, wherein the feed delivery device is an autonomous feed delivery device, due to the control system which is at least partially a part of the feed delivery device.

17. The feeding system according to claim 15, further comprising a feed stock system and a loading station, wherein the feed delivery device is configured to deliver feed from the loading station to the one or more feeding locations, and wherein the feed loading system is configured to deliver feed from the feed stock system to the feed loading station to fill the feed delivery device when the feed delivery device is in the loading station.

18. The feeding system according to claim 15, wherein the feed delivery device comprises a rest feed measurement system configured the determine the amount of feed at a feeding location.

19. The feeding system according to claim 15, further comprising a mixing device for mixing feed.

20. The feeding system according to claim 19, wherein the mixing device is provided as part of the feed delivery device.

21. The feeding system according to claim 15, wherein the feed control system is further configured to determine a maximum filling amount of the feed delivery device for the determined feed composition.

22. The feeding system according to claim 21, wherein the feed delivery device is filled with the maximum filling amount of feed.

23. The feeding system according to claim 22, wherein the feed control system is further configured to select the feeding locations until the sum of the amounts of feed to be delivered to all selected feeding locations equals or exceeds the maximum filling amount.

24. The feeding system according to claim 15, wherein the feed control system is further configured to select the first feeding location by determining a respective priority for the feeding locations having a feed requirement, wherein the first feeding location is the feeding location having the highest priority.

25. The feeding system according to claim 24, wherein the feed control system is further configured to select further feeding locations in descending order of priority.

26. The feeding system according to claim 24, wherein the feed control system is further configured to determine which feeding locations have a feed requirement, based on a rest feed measurement which is representative for the amount of feed remaining at a feeding location, and wherein the feed control system is further configured to determine a respective priority for the feeding locations having a feed requirement, based on the rest feed measurement.

27. The feeding system according to claim 24, wherein the feed control system is further configured to determine a respective priority for the feeding locations having a feed requirement, based on a period of time measured from a starting point in time when a feeding requirement of a respective feeding location was determined for the first time after an earlier point in time when feed was delivered to that location.

28. The feeding system according to claim 15, wherein the feed control system is further configured to determine which feeding locations have a feed requirement, based on a rest feed measurement which is representative for the amount of feed remaining at a feeding location.

29. The feeding system according to claim 28, wherein the feed control system is further configured to determine which feeding locations have a feed requirement by comparing the rest feed measurement with a threshold value representative for a minimum amount of feed, wherein a feeding location is determined to have a feed requirement when the rest feed measurement for said feeding location is below the threshold value corresponding to said feeding location.

30. The feeding system according to claim 29, wherein the feed control system is further configured to determine a respective priority for the feeding locations having a feed requirement by determining a difference between the respective rest feed measurement and the corresponding threshold value for each feeding location having a feed requirement, and wherein the first feeding location is the feeding location having the largest difference.

31. The feeding system according to claim 15, wherein the feed delivery device is configured to move along a predetermined route past a plurality of feeding locations when distributing the feed.

32. The feeding system according to claim 31, wherein the feeding locations comprised in the predetermined route are grouped depending on obstacles present along the standard route that may interfere with the feed delivery device during distributing the feed, and wherein the feed control system is further configured to select only further feeding locations which belong to the same group as the first feeding location.

33. A method for distributing feed over a plurality of separate feeding locations using a feed delivery device, comprising the following steps:
 a) determining which feeding locations have a feed requirement;
 b) selecting a first feeding location among the feeding locations having a feed requirement;
 c) determining a feed composition for the feed to be delivered to the first feeding location and determining a first feed amount of said feed to be delivered to the first feeding location;
 d) determining which further feeding locations having a feed requirement require the same feed composition as the first feeding location;
 e) selecting at least one further feeding location and determining a further amount of said feed to be delivered to said further feeding location;
 f) filling the feed delivery device with an amount of the determined feed composition; and
 g) distributing the filled amount of feed in the feed delivery device over the selected feeding locations,
 wherein the amount of feed from the filled amount which is distributed to a selected feeding location is dependent on the ratio between the amount of feed to be delivered to said selected feeding location and the sum of the amounts of feed to be delivered to all selected feeding locations times the filled amount;
 wherein selecting a first feeding location comprises determining a respective priority for the feeding locations having a feed requirement, wherein the first feeding location is the feeding location having the highest priority; and
 wherein determining which feeding locations have a feed requirement is based on a rest feed measurement which is representative for the amount of feed remaining at a feeding location, and wherein determining a respective priority for the feeding locations having a feed requirement is based on the rest feed measurement.

34. A method for distributing feed over a plurality of separate feeding locations using a feed delivery device, comprising the following steps:
 a) determining which feeding locations have a feed requirement;
 b) selecting a first feeding location among the feeding locations having a feed requirement;
 c) determining a feed composition for the feed to be delivered to the first feeding location and determining a first feed amount of said feed to be delivered to the first feeding location;
 d) determining which further feeding locations having a feed requirement require the same feed composition as the first feeding location;
 e) selecting at least one further feeding location and determining a further amount of said feed to be delivered to said further feeding location;
 f) filling the feed delivery device with an amount of the determined feed composition; and
 g) distributing the filled amount of feed in the feed delivery device over the selected feeding locations,
 wherein the amount of feed from the filled amount which is distributed to a selected feeding location is dependent on the ratio between the amount of feed to be delivered to said selected feeding location and the sum of the amounts of feed to be delivered to all selected feeding locations times the filled amount;
 wherein selecting a first feeding location comprises determining a respective priority for the feeding locations having a feed requirement, wherein the first feeding location is the feeding location having the highest priority; and
 wherein determining a respective priority for the feeding locations having a feed requirement is based on a period of time measured from a starting point in time when a feeding requirement of a respective feeding location was determined for the first time after an earlier point in time when feed was delivered to that location.

35. A feeding system for distributing feed over a plurality of separate feeding locations in a farm, the system comprising:
a feed delivery device;
a feed loading system; and
a feed control system,
wherein the feed delivery device is configured to deliver feed to one or more feeding locations, wherein the feed loading system is configured to fill the feed delivery system and wherein the feed control system is configured to:
a) determine which feeding locations have a feed requirement;
b) select a first feeding location among the feeding locations having a feed requirement;
c) determine a feed composition for the feed to be delivered to the first feeding location and determine a first amount of said feed to be delivered to the first feeding location;
d) determine which further feeding locations having a feed requirement require the same feed composition as the first feeding location;
e) select at least one further feeding location and determine a further amount of said feed to be delivered to said further feeding location;
f) control the feed loading system to fill the feed delivery device with an amount of the determined feed composition; and
g) control the feed delivery device to drive and move along the selected feeding locations and to distribute the filled amount of feed in the feed delivery device over the selected feeding locations,
wherein the amount of feed distributed to a selected feeding location is dependent on the ratio between the amount of feed to be delivered to said selected feeding location and the sum of the amounts of feed to be delivered to all selected feeding locations times the filled amount;
wherein the feed control system is further configured to select the first feeding location by determining a respective priority for the feeding locations having a feed requirement, wherein the first feeding location is the feeding location having the highest priority.

36. The feeding system according to claim 35, wherein the feed control system is further configured to select further feeding locations in descending order of priority.

37. The feeding system according to claim 35, wherein the feed control system is further configured to determine which feeding locations have a feed requirement, based on a rest feed measurement which is representative for the amount of feed remaining at a feeding location, and wherein the feed control system is further configured to determine a respective priority for the feeding locations having a feed requirement, based on the rest feed measurement.

38. The feeding system according to claim 35, wherein the feed control system is further configured to determine a respective priority for the feeding locations having a feed requirement, based on a period of time measured from a starting point in time when a feeding requirement of a respective feeding location was determined for the first time after an earlier point in time when feed was delivered to that location.

39. A feeding system for distributing feed over a plurality of separate feeding locations in a farm, the system comprising:
a feed delivery device;
a feed loading system; and
a feed control system,
wherein the feed delivery device is configured to deliver feed to one or more feeding locations, wherein the feed loading system is configured to fill the feed delivery system and wherein the feed control system is configured to:
a) determine which feeding locations have a feed requirement;
b) select a first feeding location among the feeding locations having a feed requirement;
c) determine a feed composition for the feed to be delivered to the first feeding location and determine a first amount of said feed to be delivered to the first feeding location;
d) determine which further feeding locations having a feed requirement require the same feed composition as the first feeding location;
e) select at least one further feeding location and determine a further amount of said feed to be delivered to said further feeding location;
f) control the feed loading system to fill the feed delivery device with an amount of the determined feed composition; and
g) control the feed delivery device to drive and move along the selected feeding locations and to distribute the filled amount of feed in the feed delivery device over the selected feeding locations,
wherein the amount of feed distributed to a selected feeding location is dependent on the ratio between the amount of feed to be delivered to said selected feeding location and the sum of the amounts of feed to be delivered to all selected feeding locations times the filled amount;
wherein the feed control system is further configured to determine which feeding locations have a feed requirement, based on a rest feed measurement which is representative for the amount of feed remaining at a feeding location;
wherein the feed control system is further configured to determine which feeding locations have a feed requirement by comparing the rest feed measurement with a threshold value representative for a minimum amount of feed, wherein a feeding location is determined to have a feed requirement when the rest feed measurement for said feeding location is below the threshold value corresponding to said feeding location; and
wherein the feed control system is further configured to determine a respective priority for the feeding locations having a feed requirement by determining a difference between the respective rest feed measurement and the corresponding threshold value for each feeding location having a feed requirement, and wherein the first feeding location is the feeding location having the largest difference.

* * * * *